(12) United States Patent
Demakakos et al.

(10) Patent No.: US 7,092,362 B1
(45) Date of Patent: Aug. 15, 2006

(54) TERMINAL EXTENSION REPEATER

(75) Inventors: William N. Demakakos, Brooklyn, NY (US); Forrest P. Neal, III, Damascus, MD (US)

(73) Assignee: Verizon Services Corp., Arlington, VA (US)

( * ) Notice: Subject to any disclaimer, the term of this patent is extended or adjusted under 35 U.S.C. 154(b) by 853 days.

(21) Appl. No.: 09/630,413

(22) Filed: Aug. 1, 2000

(51) Int. Cl.
*H04J 1/16* (2006.01)

(52) U.S. Cl. .................................................. 370/249

(58) Field of Classification Search ........ 370/241–249, 370/293, 294, 501, 502; 379/93.01, 399.01, 379/1.01, 4, 22, 220; 714/716, 821; 375/211, 375/213
See application file for complete search history.

(56) References Cited

U.S. PATENT DOCUMENTS

| | | | | |
|---|---|---|---|---|
| 4,107,469 A | * | 8/1978 | Jenkins ........................ | 370/505 |
| 4,980,887 A | * | 12/1990 | Dively et al. ................ | 714/713 |
| 5,060,226 A | * | 10/1991 | Gewin et al. ................ | 370/244 |
| 5,224,149 A | * | 6/1993 | Garcia ........................ | 379/22.01 |
| 5,343,461 A | * | 8/1994 | Barton et al. ................ | 370/249 |
| 5,422,876 A | | 6/1995 | Turudic | |
| 5,422,929 A | * | 6/1995 | Hurst et al. .................... | 379/4 |
| 5,437,023 A | * | 7/1995 | Sheets et al. ............. | 379/22.08 |
| 5,521,977 A | * | 5/1996 | Bergstrom et al. ..... | 379/413.04 |
| 5,600,656 A | * | 2/1997 | Kelsey et al. ................ | 714/713 |
| 5,680,405 A | * | 10/1997 | Pesetski et al. ............. | 714/713 |
| 5,726,993 A | * | 3/1998 | Kelsey et al. ................ | 714/713 |
| 5,889,785 A | * | 3/1999 | Pesetski et al. ............. | 714/713 |
| 5,907,614 A | * | 5/1999 | Bergstrom et al. ..... | 379/413.04 |
| 6,151,691 A | * | 11/2000 | Pesetski et al. ............. | 714/713 |
| 6,453,432 B1 | * | 9/2002 | Pesetski et al. ............. | 714/713 |

OTHER PUBLICATIONS

Noran Tel NTI-95008-SIJ Product Data Sheet, 9508-07A, Jun. 7, 1999.*
Noran Tel 95008-SIJ T1 Long Haul Service Interface Jack<technical Practices Tech:9508, Jan. 22, 1997.*
T1E1. 2/98-007, Mar. 2, 1998, Draft revision of T1.408-1990.*

* cited by examiner

*Primary Examiner*—Doris H. To
*Assistant Examiner*—Dmirty Levitan
(74) *Attorney, Agent, or Firm*—Leonard C. Suchtya, Esq.; Joel Wall, Esq.; Rader Fishman & Grauer PLLC (57) ABSTRACT

An extension repeater which interfaces between a digital service network and a local network span combines extensive diagnostic and operational functions in a single, space-efficient device. The functions include simultaneous loop-back capability in both the direction of the digital service network and the local network span, signal regeneration capability in both directions, non-intrusive monitoring connections for each side of the repeater, and visual indicators of the loopback states as well as the framing type of the data received from the digital service network and the local network span. Furthermore, the extension repeater is physically sized and shaped to fit in standard wall-mount telephone equipment shelves in order to provide economical and simplified installation of the repeater at locations outside of a telephone network central switching office.

42 Claims, 4 Drawing Sheets

TERMINAL EXTENSION REPEATER

FIELD OF THE INVENTION

The present invention relates to digital transmission networks and more particularly, to an outside-plant extension repeater for a link of a digital transmission network.

BACKGROUND

Since the 1960s, the public switched telephone networks have utilized time-division multiplexed systems to carry both voice and data signals over a digital communications link. One of the earliest and most commonly used carrier systems for such signals is the T-carrier system. The T1 line is probably the most common type of T-carrier in use today. In North America, it typically provides a 4-wire transmission path that transmits bipolar pulse streams at bit rates of 1.544 Mbps. The four wires provide a full-duplex capability with one pair of wires for receiving and another pair for sending at the same time. Originally, the four wires were formed by two pairs of twisted-pair copper wires, but T1 wiring may now also include coaxial cable, optical fiber and other media. Standard digital signals carried on a T1 line are designated as DS-1 signals and must comply with certain timing, voltage level, and pulse shape characteristics.

Within the T-carrier system, higher data transmission rates are accomplished by grouping, or multiplexing, together lower-rate signals. For example, DS-3, the signal on a T-3 carrier, carries 28 DS-1 signals for a transmission rate of 44.736 Mbps.

Initially envisioned as primarily a link for voice and data signals between central offices on the telephone network, T-carrier facilities are now commonly being used to provide high-speed data services to customer premises. In this latter role, T-carrier signals are provided between a central office and a multiplexer/demultiplexer at a customer's building. At this location, a digital signal cross-connect (DSX) is typically present to pass signals between the multiplexer and one or more local transmission facilities. The DSX specifies the electrical interface required for connecting equipment which will communicate using a particular signal type. For example, DSX-1 defines the set of parameters needed for connecting lines carrying DS-1 signals. This relatively new use of transmission facilities has created the need for additional outside plant equipment as well as additional functionality in the equipment that is currently in place. The need for repeaters with expanded capabilities to interface between a DSX-1 network and a local span network at a customer's building is one example of such equipment.

However, T1 repeaters, as are known in the art, include many shortcomings which make them impractical and insufficient to operate within this new environment at or near a customer's building.

Repeaters utilize signal regeneration to accomplish their function of shaping signals. Regeneration involves receiving a distorted, weakened, or attenuated digital signal and reconstructing it so that its amplitudes, waveforms and the timings of its elements are constrained within specified limits. One family of repeaters, known as extension repeaters, regenerate signals in only one direction; the particular direction depending on the orientation of the repeater. Even though these repeaters are connected to each direction of the bi-directional facilities, they are designed with regeneration circuitry for only one direction. They are typically used in locations where certain assumptions about the adjacent equipment down the line are known to be true; with one of the assumptions being that the adjacent equipment in one direction can tolerate attenuated signals and has its own regeneration capability. Therefore, in such a case, the extension repeater does not need to provide regeneration in that direction. The most common use of these repeaters are within and between central offices where the connected equipment at each link is known and is controlled by the same parties who provision the repeaters. An installer of an extension repeater simply orients the repeater so that the regenerated output signal is provided in the correct direction. The prior art extension repeaters fail, however, to provide simultaneous signal regeneration in both directions.

Within the inter and intra office environments using T-carrier facilities, "line" repeaters are known which do have bi-directional signal regeneration capability. Because of the limited use intended for these repeaters, however, they include only very basic loopback and diagnostic capabilities. A loopback refers to a point in a communications network at which an incoming signal is "looped" and returned along its transmit path. Loopbacks are typically used to troubleshoot a network problem by verifying that the connection path between two devices in a network is functioning correctly. Previous line and extension repeaters lacked extensive loopback capability. In particular, they failed to provide selectable loopbacks toward the DSX-1 network, toward the local network span, and both sides simultaneously Another practical shortcoming of current extension repeaters is their physical size. Because of the central office environment in which they were historically utilized, extension repeaters are relatively large and require rack mounting shelves to accommodate them. To compound the problem, such repeaters were, and are, rarely utilized individually but are rather routinely grouped together in large multiples such as 28 for handling DS-3 signals. While this size and aggregation of repeaters may be acceptable in the central office environment, the existing equipment racks and shelves for these repeaters are far too bulky and impractical for the typical telecommunication equipment room present in most customers' buildings.

SUMMARY OF THE INVENTION

The present invention addresses these and other shortcomings of the prior art by providing a T1 extension repeater which provides diagnostic and operational functions not presently available in repeaters which interface a T1 local network span to terminal devices with a span to a digital services network. Certain embodiments of the extension repeater of the present invention interface between a DSX-1 network and a local T1 span and provide simultaneous bi-directional loopback capabilities, signal regeneration in both directions, a monitoring jack for each side of the repeater, and visual indicators of the repeater's status. Furthermore, the repeater is physically sized and shaped to fit in standard wall-mount telephone equipment shelves to provide economical and simplified installation of the repeater at locations outside a central office.

One aspect of the present invention relates to an extension repeater with simultaneous bi-directional loopback capability; another aspect relates to an extension repeater with simultaneous bi-directional regeneration of data signals.

Aspects of the present invention also relate to an extension repeater which detects and visually indicates a data framing format in both directions.

Another aspect of the present invention relates to an extension repeater with detection of remote loop-up and loop-down codes wherein a plurality of different code formats are recognized.

A further aspect of the present invention relates to an extension repeater with a panel or faceplate which provides non-intrusive jack-access to transmission signals.

An additional aspect of the present invention relates to an extension repeater which conforms to an industry standard form-factor for NCTE that includes wall mounting provisions.

Another additional aspect of the present invention relates to an extension repeater which interfaces between the terminal side of a digital services network and the network side of a local network span connected to CPE.

Additional aspects, objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PRESENTLY PREFERRED EMBODIMENTS

Figure 1:
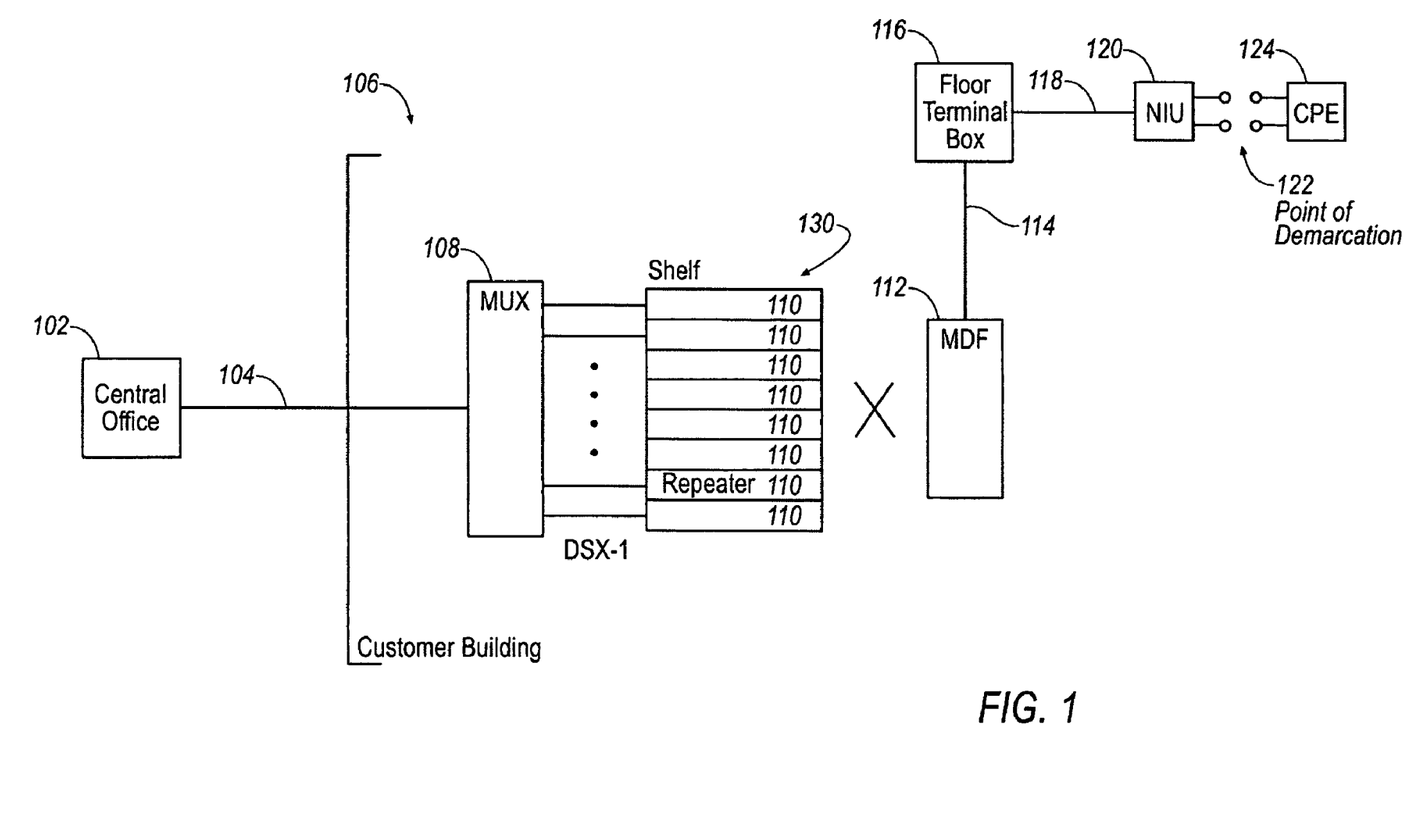
FIG. 1 illustrates an exemplary environment for a repeater according to the present invention.

FIG. 1 illustrates an exemplary environment for certain embodiments of extension repeaters according to the present invention. Transmission of signals from the central office 102 to a customer destination 106 is accomplished over digital line facilities 104. As indicated earlier, these facilities 104 support bi-directional communication and therefore, in practice, transmission of signals from the customer destination 106 to the central office 102 is also accomplished over the facilities 104. These facilities may provide large numbers of telephone lines to high volume customers. Increasingly, these relatively high speed facilities are used to provide dedicated Internet connectivity to the customer's destination 106, to provide wide area intranetwork links, or to provide data intensive services such as video or multimedia services. Throughout the remainder of the present description, the network facilities are assumed to be bi-directional even if not explicitly identified as such. However, the description will explicitly and clearly note when a signal's direction is instrumental to the understanding and explanation of the present invention.

Possible physical media for facilities 104 contemplated within the scope of the present invention include, but are not limited to, copper twisted-pair, optical fiber and coaxial cable. In the exemplary environment described, facility 104 is a fiber facility which carries DS-3 signals. These signals arrive from the central office 102 to a fiber multiplexer 108 which transforms the optical signals into electrical signals and demultiplexes them into 28 DS-1 signals conforming with DSX-1 interface requirements. The fiber multiplexer 108, in a typical installation, is located near or under the ground at a customer's building within a telecommunications room or closet. Nearby is often a building main distribution frame (MDF) 112 consisting of a jack panel or bay for connecting in-building wiring facilities to the signals from the multiplexer 108. On the customer side, as opposed to the telephone network side, of the MDF 112 are physical media, referred to as a local T-1 span, for transmitting each DS-1 signal to and from a point of demarcation 122. The point of demarcation 122 signifies where the communication services provider's maintenance responsibilities end and the customer's responsibilities begin. For instance, equipment 124 located after the point of demarcation is often referred to as customer premises equipment (CPE) in recognition of the equipment 124 being within the customer's realm of responsibility.

In providing services, for instance, to multifloor buildings, the facilities between the MDF 112 and the point of demarcation 122 often include riser cables 114, which span multiple floors, and horizontal cable runs 118, which link from a floor's terminal box 116 to the point of demarcation 122. At the point of demarcation 122, a Network Interface Unit (NIU) 120 is present to ensure the signals transmitted to and received from the actual CPE 124 devices are formatted properly.

FIG. 1 depicts only a single local network span starting at the MDF 112, including cable runs 114 and 118 and ending at the point of demarcation 122 located on the customer's side of the NIU 120. Typically, there are many such local spans at a customer's building because multiple DS-1 signals are provided over the facilities 104. These individual spans provide the transmission facilities in both directions from a building's communication closet to the customer's network equipment, and can include cabling of non-standard gauges that have been installed and repaired by various service personnel during its lifetime.

The riser cables 114 and horizontal runs 118 affect the attenuation of signals they transport by both their length and electrical characteristics (e.g. gauge). A T1 span line, using 22 AWG wire, has a range of approximately 6000 feet. To have longer spans, or to use smaller wire, some form of repeater is necessary because of signal loss. In FIG. 1, a repeater shelf 130 is depicted which holds multiple extension repeaters 110 that shape signals in both directions between the DSX-1 network on one side and the local T1 span on the other side. This bi-directional regenerative capability is different than similarly positioned extension repeaters of the prior art which regenerated signals only in the direction towards the DSX-1 network.

The present inventive extension repeaters 110 also include expanded loopback and diagnostic capabilities. As described earlier, a loopback refers to a point in a communications network at which an incoming signal is "looped" and returned along its transmit path. Loopbacks are typically used to troubleshoot a network problem by verifying that the connection path between two devices in a network is functioning correctly. According to embodiments of the present invention, the repeater 110 is able to loopback towards the DSX-1 network, towards the local T1 span, and also both sides simultaneously. Previous line and extension repeaters lacked such extensive loopback capability. For example, a technician troubleshooting the local T1 span can inject a signal at the point of demarcation and analyze its return signal when the repeater 110 is in loopback towards the local T1 span. The test signal will traverse the up-stream direction (i.e., towards the CO) of local T1 span, reach the extension repeater 110, be looped-back towards the technician, and traverse the down-stream direction of the local T1 span. In this example, the presence of a correct return signal verifies the operation of all elements within the local T1 span. The absence of the correct signal indicates a problem within the span and further troubleshooting is needed to pinpoint the malfunction.

Within the environment illustrated in FIG. 1, the shelf 130 supporting the extension repeaters 110 is located near the multiplexer 108 and the MDF 112 in the particular building thereby dictating, to some degree, the location of the repeaters 110. Often, no dedicated room is provided for this equipment or, at best, a small telecommunications closet or other shared utility space is available. The extension repeaters 110 within this environment, therefore, have physical sizing and mounting constraints not present in previous central office installations.

Figure 2A:
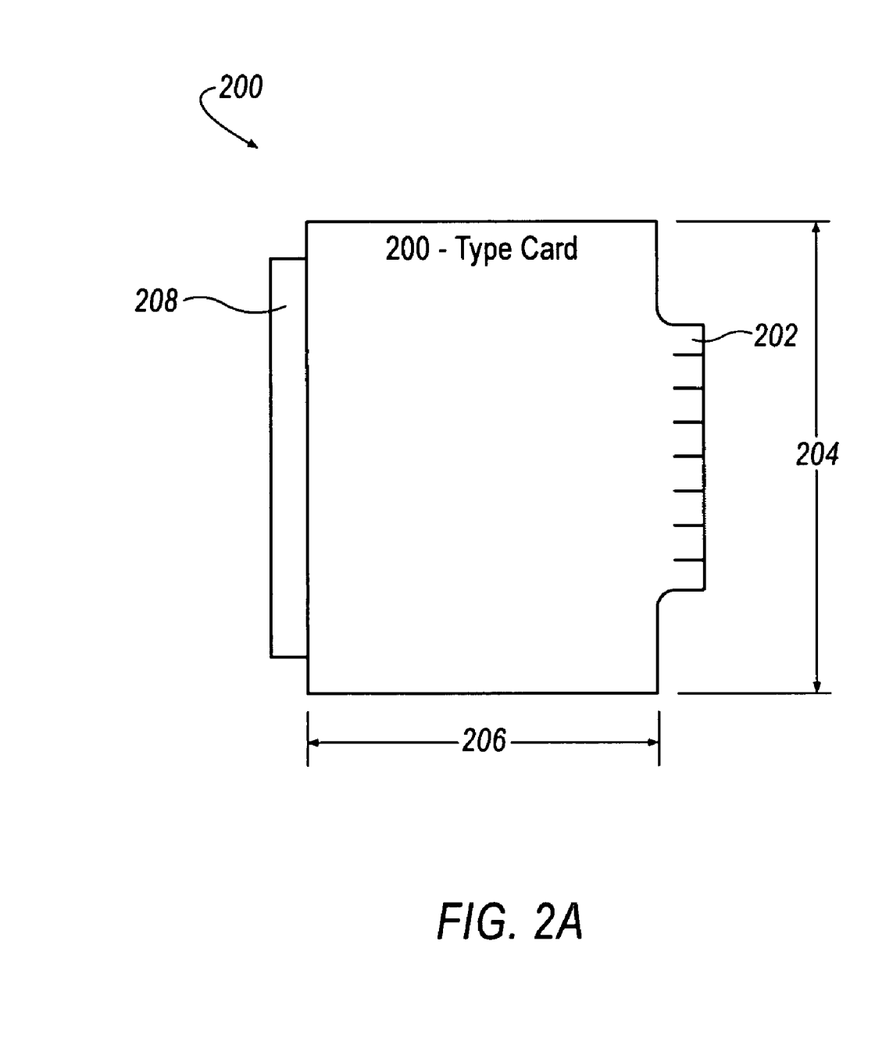
FIGS. 2a and 2b illustrate a side and front view, respectively, of a 200-type form factor circuit card, which is preferred for the inventive repeater.

An extension repeater according to the present invention preferably utilizes a form factor, or the physical characteristics, of industry standard wall-mounted customer premises equipment instead of configurations originally designed for network installations (e.g. CO or CEV). FIG. 2a illustrates a repeater implemented on a circuit card 200 according to at least one embodiment of the present invention. A well known industry standard for Network Communication Terminal Equipment (NCTE) is the "400-type" standard. This standard defines a 56 pin pin-out and interface 202 along with the physical dimensions of approximately 13.5 mm in length (206) and approximately 14 mm in height (204). The faceplate of a 400-type card is approximately 3.2 mm in width. A 200-type card, the preferred embodiment of the present invention, has similar dimensions except that its faceplate 208 is half the width 210 of the 400-type faceplate, thereby allowing twice as many 200-type cards to fit in a particular card cage. There are numerous benefits which arise from the repeater of the present invention being compliant with the industry standard 200-type form factor.

One result of the repeater card 200 complying with this form factor is that the type of structural and electrical mounting hardware used to support this size card is already being used in current installations for other types of network equipment. Because of the wide variety and environments for existing NCTE which meets the 400-type standards, different mounting shelves have been designed to accommodate a variety of different numbers of cards of this size. In addition to the variety of shelves already available, brackets and other mounting hardware have also been designed and installed for these different sized shelves. Unlike the previous repeater racks only designed for equipment in multiples of 28, there are many 400-type (and 200-type) racks which exist for fewer numbers of repeaters.

In addition to shelves supporting a wider range of numbers of repeaters, the shelves for 400-type equipment are also wall mountable. Within the industry, 400-type and 200-type devices have been utilized in a variety of situations for a variety of equipment in which space is at a premium. Presently, shelving and other support hardware for such devices exist in a wide range of sizes that can easily be mounted on a wall. As indicated earlier, present repeaters, because of historical reasons, are available in a bulky form factor and a rack-mounted arrangement which are impractical for the environment of the present invention. By complying with a 200-type form factor, an extension repeater according to the present invention, fits in presently available wall-mounted mounting shelves in a space that is practical for the environment illustrated in FIG. 1.

From the perspective of the network service provider who also provides the equipment on the network side of the point of demarcation, the use of industry standard, and approved, shelves, mountings, and support equipment minimizes both the cost, time and training needed to install new equipment. Clearly, recycling and re-use of existing hardware are also benefits of using 200-type card repeaters. Another significant benefit is that current and future network equipment (e.g. HDSL units) which are also designed to comply with the 200-type or 400-type standard can be used in the same shelf as the extension repeaters of the present invention, and vice versa.

Another aspect of the 200-type form factor is the specifying of power and ground pins on interface 202. A compliant repeater card, therefore, is able to utilize local power already available at the shelf (typically 48 VDC) and therefore does not require provisioning for additional power supplies and connections.

While the present invention does contemplate repeaters having physical sizes other than a 200-type form factor, other embodiments are also contemplated which take full advantage of all the above-identified benefits.

Figure 2B:
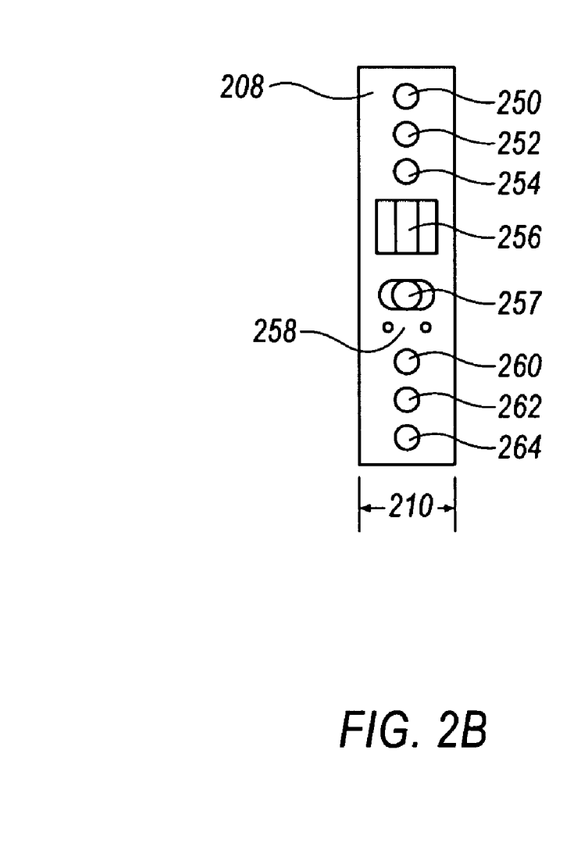

FIG. 2b illustrates additional aspects of the present invention in the embodiment complying with the 200-type form factor specifications. The faceplate 208 includes jacks 250–254 and 260–264. These jacks provide a full DSX-1 interface for both signal directions. The presence of the DSX-1 interface allows service personnel a full range of diagnostic capabilities while located at the repeater itself. Both non-intrusive connections, for monitoring signals, as well as intrusive connections, for signal tapping and injecting, are provided through the groups of jacks 250–254 and 260–264.

Multiple LEDs 256 are provided which indicate any alarm conditions on the network, the signal framing formats being used in both signal directions, the loopback state of the repeater, and other status information. Test points 258 are also provided at the faceplate 208 to measure the power levels on the connected span. Push button 257 is provided so that service personnel can control the loopback state of the repeater locally without needing to inject a control signal from some nearby location or request that the CO send a control signal from their location.

Figure 3:
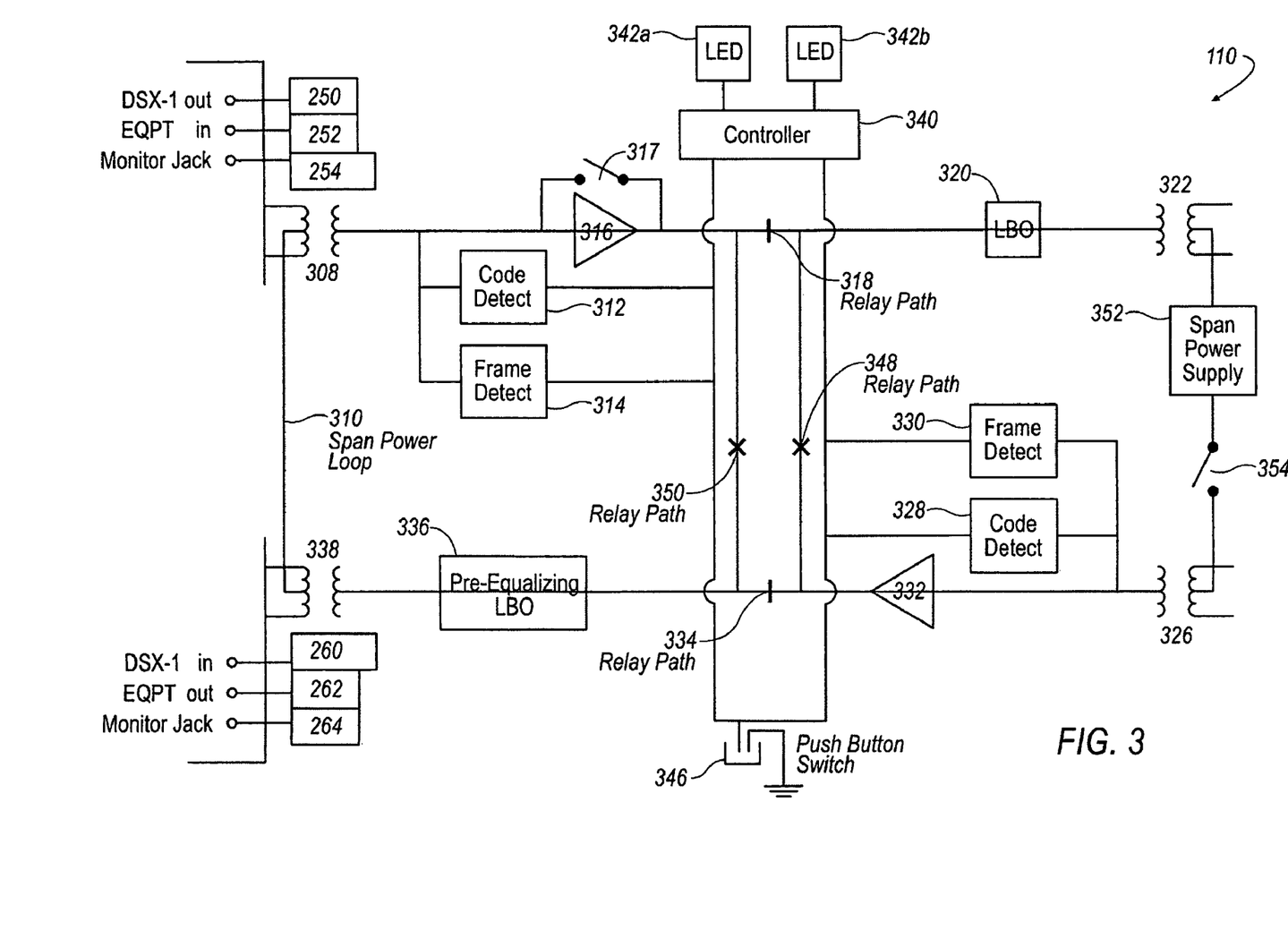
FIG. 3 illustrates a functional block diagram of a repeater according to certain embodiments of the present invention.

FIG. 3 illustrates a functional block view of the repeater card according to particular embodiments of the present invention and assists with a more detailed explanation of the repeater's functions.

Traditional industry terminology defines a side 1 and a side 2 for the repeater 110 of FIG. 3. The term "side" does not refer to a physical side of the repeater, but rather, refers to a signal direction. In the perspective of FIG. 1, side 1 receives signals from the multiplexer 108 and forwards them towards the NIU 120. In reference to FIG. 3, side 1 receives signals from the DSX-1 network at a transformer 308 which then pass through the repeater 110 for delivery to the local T1 span at a transformer 322. Along the way the signal is analyzed by a loopback code detector 312 and framing detector 314 which both provide their outputs to a controller 340. The signal normally passes through the signal regenerator 316 and then the closed relay path 318 to a line build out (LBO) circuit 320 which generates the correct signal levels for output to the local T1 span. If the repeater 110, however, is looped-back towards the DSX-1 network then the regenerated signal from the regenerator 316 travels through the closed relay path 350, to a LBO circuit 336. From the LBO circuit 336, the signal is output to a transformer 338 connected to the DSX-1 network.

Side 2 provides signals in the opposite direction. Signals are received from the local T1 span at a transformer 326 and pass through the repeater 10 for delivery to the DSX-1 network at a transformer 338. Along the way the signal is analyzed by a loopback code detector 328 and framing detector 330 which both provide their outputs to a controller 340. The signal normally passes through the signal regenerator 332 and then the closed relay path 334 to a pre-equalizing line build out (LBO) circuit 336 which generates the correct signal levels for output to the DSX-1 network. If the repeater 110, however, is looped-back towards the local T1 span, then the regenerated signal from the regenerator 332 travels through the closed relay path 348, to a LBO circuit 320. From the LBO circuit 320, the signal is output to a transformer 322 connected to the local T1 span.

A push button 346 which locally controls the loopback state of the repeater 110 is connected with the controller 340 along with multiple, multifunctional LEDs 342a and 342b. The inputs to the controller 340 from the push button 346, the framing detectors 330 and 314, and the loopback code detectors 328 and 312 determine which of the relay paths 318, 334, 348 and 350 are open and closed as well as the state of the LEDs 342a and 342b.

A power span loop 310 connects across the DSX-1 network transformers 308 and 338, and a switch 354 selectable span power supply 352 connects across the local T1 span transformers 322 and 326 to power equipment on the local T1 span. Jacks 250–254 are available for signals on side 1 and jacks 260–264 are available for signals on side 2.

The present repeater has a number of diagnostic features to improve both the extent and the simplicity of the troubleshooting options offered to a technician. The two groups of jacks 250–254 and 260–264 allow a variety of signal injection and monitoring options to a technician. In particular, the jacks provide a full DSX-1 interface at the repeater 110. The wide variety of currently available, and future, test equipment such as signal analyzers and code injectors designed for DSX-1 interfacing can be utilized right at the repeater's location. Without these jacks, a technician would be required to travel to other portions of the network to locate diagnostic and troubleshooting ports to use.

Non-intrusive monitor jacks 254 and 264 offer high-impedance taps into side 1 and side 2 signals, respectively. Due to isolation resistors of approximately 300 Ω at these jacks, non-intrusive monitoring of signals in both directions can be performed. Without such isolated connections, tapping of any signal could not be performed while the network connection is operating. This ability to perform real-time, in-place testing of the network signals provides additional diagnostic capability not possible with other, intrusive testing procedures.

The other 4 jacks, however, do offer intrusive access to the signal paths as is currently provided at DSX-1 cross-connect panels. With these intrusive-access jacks 250, 252, 260 and 262, a technician can tap received signals and also inject codes and other signals to simulate data from the DSX-1 network, from the repeater to the local T1 span, from the local T1 span, and from the repeater to the DSX-1 network. Analysis of tapped signals at the repeater as well as injecting signals for analysis at other network locations assist with identifying transmission faults and their locations.

Both side 1 and side 2 have a DS-1 frame format detector 312 and 330 respectively. Such detectors are known in the art but have not been utilized on extension repeaters. These detectors determine, based on the received data's characteristics, the DS-1 framing type being used by the sending network. Framing possibilities include: unframed, SF/D4, and T1-ESF and define exactly how data and control bits are grouped, what are allowed bit sequences, and what bit codes indicate frame beginnings. Each frame detector forwards the framing determination to a controller 340 which illuminates an appropriate LED or other visual indicator. Each side of the repeater has a framing indicator 342a which allows a technician to quickly determine if the local T1 span and the DSX-1 network agree on the framing type being used. A separate LED can be used for each different framing type or a single multicolor or multifunction (e.g. flashing) LED can be used to indicate the different type of frames.

Also present on both sides are signal regenerators 316 (side 1) and 332 (side 2). As previously explained, these regenerators are used to reconstruct signals which may have been attenuated or distorted over a previous network segment. In certain embodiments of the present invention, the side 1 regenerator 316 can be selectably disabled (or bypassed), by a switch 317, so that the signal to the local T1 span is not regenerated. Previous extension repeaters included regeneration towards the local T1 span (i.e. side 1). As noted previously, the present inventive repeater 110 provides regeneration in both directions using the regenerators 316 and 332. However, if legacy operation of the repeater 110 is desired, then the side 1 regenerator 316 can be selectively disabled. If the side regenerator 316 is not enabled then the signals reaching the NIU (FIG. 1, 120) may be too weak to be received error-free; when the regenerator 332 is enabled, the present inventive repeater 110 prevents this problem from occurring.

Each side of the repeater also has line build out (LBO) circuitry which controls the DS-1 signals generated. The line build out 320 for side 1 has slightly different functionality than the line build out 336 for side 2. Both line build out circuits 320 and 336 typically include multiposition switches which an installer sets during initial installation of the equipment based on the signal levels received by the equipment from the respective network. For circuitry 320, for example, such a switch controls the insertion of artificial loss to keep from overdriving the signal towards the local T1 span. When the difference in power levels between the signals to and from the local T1 span are great, significant crosstalk occurs between the wire pairs which must be avoided.

The circuitry 336 on side 2 has additional pre-equalizer features. The DSX-1 interface has stringent pulse shape constraints which the circuitry 336 must handle as well. In particular, the repeater can be located up to 655 feet from the DSX-1 interface (see FIG. 1) and switches are included for an installer to configure the circuitry 336 to account for the particular installed distance. The switches control a pre-equalizer which shapes an outbound signal in anticipation of the distortion that will occur between the circuitry 336 and the DSX-1 interface. Typical DSX-1 pre-equalizers can be configured for distance ranges of 0–133 feet; 134–266 feet; 267–500 feet; and 501–655 feet.

Embodiments of the extension repeater according to a significant aspect of the present invention include loopback circuitry to assist with segmentation of a network during troubleshooting operations. From the customer's perspective, the repeater 110 can loop-back towards them so that signals injected at the customers equipment, traverse the local T1 span and return to the customer's equipment. From the CO's perspective, the repeater 110 can loop-back towards the DSX-1 network so that signals injected from the CO traverse the network facilities and return to the CO for analysis.

The loopback circuitry towards the DSX-1 side includes signal relay paths 318 and 350. Relays under the supervision of the controller 340 determine the state of the loopback circuit. This loopback, towards the DSX-1 network, is either "down" (signals travel through relay path 318 to the local T1 span) or the loopback is "up" (relay path 318 is open and signals from the DSX-1 network travel through closed relay path 350 and back to the DSX-1 network through transformer 338). Similarly, for looping towards the T1 local span, when its loopback is down, signals pass through relay path 334 and when its loopback is up, the signal path is through closed relay path 348. As is known in the art, the repeater sends an Alarm Indication Signal (AIS) to the local T1 span when the DSX-1 loopback is up and sends it to the DSX-1 network when the local T1 span loopback is up.

While a loopback is up, a technician injecting a signal in one direction on the network expects it to reach and pass through the looped-back repeater and then to receive the same signal back from the other direction. The simplest test, then, is to simply detect the presence (or absence) of the test signals. Other, more complicated testing can also be accomplished. The received signal can be compared against the sent signal to test signal levels, bit-error-rates, and other distortions. The loop-back features of the present inventive repeater allow a network to be segmented so a fault, if present, can be more easily located.

Both local and remote control of the loopback circuits are contemplated within the scope of the present invention. Local control is provided through a push button switch 346, or other multiposition switch, which signals the controller 340 to loop-up or loop-down the appropriate loopback circuitry. In at least one embodiment, a technician at the repeater pushes the button once to loop towards the DSX-1 network; a second push of the button loops towards the local T1 span. In this configuration, loopbacks in both directions are simultaneously available to enable testing of network segments from the point of demarcation or CPE as well as from the DSX-1 interface or even the central office (see FIG. 1). A third push of the button loops down both circuits.

Remote control of the loopback circuitry involves loopback code detectors 312 and 328. These detectors 312 and 328 determine if signals received at side 1 and side 2, respectively, are loopback control codes rather than standard data frames. Within the industry, 16-bit and 7-bit in-band codes have been developed to provide remote control of loop-up circuitry within network equipment. "In-band" means that the code signals are sent along the same channels as the data signals and some type of detector at a device is needed to recognize that a particular code contained in the data stream was received addressed to that device. When a detector in the network equipment recognizes these codes in the incoming signal, they activate appropriate loopback circuitry in the equipment.

The industry has developed two types of standard loop-up codes: 16-bit and 7-bit. Previous repeaters that provided remote loop-up capability typically recognized only one type of code. Some previous repeaters even provided a selectable code detect mechanism wherein a switch determined if the repeater would look for the 7-bit code or would look for the 16-bit code. Particular embodiments of the present invention, however, automatically detect both 16-bit and 7-bit loop-up codes from both the DSX-1 network and the local T1 span. This flexibility in code handling allows the present repeater to interoperate with a wider range of diagnostic and testing equipment. In practice, service personnel at a central office, for example, would send an in-band 16-bit loop-up code (or 7-bit code) towards the repeater. The signal would eventually arrive at the transformer 308 and the code detector 312 would recognize the loop-up code and notify the controller 340 to activate the loopback towards the DSX-1 network. In response, the relay path 318 would be opened and the path 350 would be closed. Similar remote control is also possible from the local T1 span, utilizing code detector 328, to open the relay path 334 and close the path 348 in activation of the loopback towards the local T1 span.

Because of security or other concerns, remote loop-up capabilities may not be desired at a particular repeater installation in one or both directions. The present invention, therefore, contemplates within its scope an individual switch for each detector 312 and 328 which selectably disables remote loop-up code detection. When disabled in this manner detection the in-band 16-bit or 7-bit codes to effect loop-up is not possible.

In addition to loop-up codes, remote control of the loopback circuitry of the repeater includes in-band and out-of-band loop-down codes. Code detectors 312 and 328 are configured to automatically detect in-band 3-bit and 5-bit loop-down codes as are known in the industry as well as out-of-band ESF loop-down codes. The Extended Super Frame (ESF) framing type includes an 8 Kpbs out-of-band channel. For every 192 bits of data, 193 bits are transmitted. Because 8000 frames are sent a second, 8000 bits are available each second for out-of-band information. One industry-standard use of this out-of-band channel is for sending loopback control codes. The detection of a loop-down code by either detector 312 and 328, whether in-band or out-of-band, results in the controller 340 taking down all active loopbacks. The controller 340 also has an automatic loopback timeout option which releases any active loopback after a predetermined time period (e.g. two hours). This automatic timeout option has a selectable disable switch to prevent an automatic release of a loopback.

The controller 340, in addition to looping-up and looping-down the loopback circuitry of the repeater, also controls visual indicators 342b of the loopback status. Multiple LEDs, or a multicolor or multifunction LED are different ways to indicate the variety of loopback permutations possible.

Other features of certain embodiments of the present invention include a span power loop 310 which provides a path for span power on the DSX-1 network signal paths; and a span power supply 352 which powers equipment on the local T1 span depending on the position of switch 354.

Figure 4:
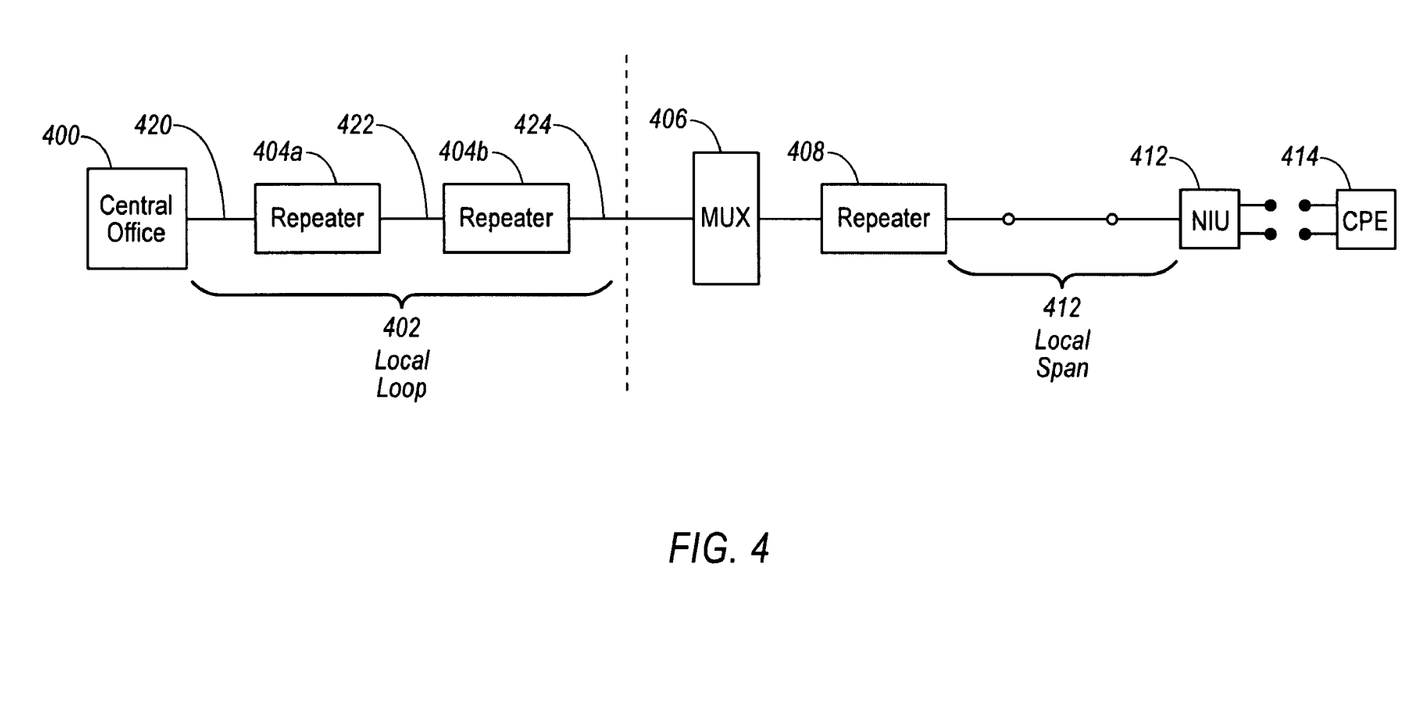
FIG. 4 illustrates an exemplary network arrangement which benefits from improved diagnostic functionality of repeaters according to certain aspects of the present invention.

As described earlier, certain embodiments of the present invention provide diagnostic capabilities not currently present in extension repeaters; in particular, these capabilities include the expanded loopback functionality of the present invention. FIG. 4 illustrates a high-level view of a repeater 408, according to the present invention, located between a central office (CO) 400 and CPE 414.

Loopbacks are used in the following manner to help isolate network problems. To troubleshoot the local loop 402, which includes traditional repeaters 404a and 404b, service personnel located at the central office 400, or even further upstream, transmit a loop-up code to repeater 408. Once the repeater 408 loops-back in the direction of the CO 400 any signals transmitted from the CO 400 are received back there if each link 420–424 and repeater 404 of the local loop 402 are functioning properly.

Technical personnel initiate transmission of a test signal going downstream from the CO. If the test signal is not returned to the CO 400 then more troubleshooting is needed. The service personnel continue by sending a loop-back code to repeater 404b. If a test signal is still not returned then repeater 404a is looped-back. If a test signal is now received at the CO 400, then the service personnel have identified link 422 as the last "bad" link and link 420 as the first "good" link. The link 422, then, is most likely the problem on the network. Also, each returned signal can be further analyzed for distortion or other errors. Sectionalizing the local loop 402 in this manner provides a logical way to locate malfunctioning equipment.

If a user of CPE 414 complains about faulty network connectivity and a test signal to a looped-back repeater 408 is received back at the CO 400, then the network fault is almost certainly located between the repeater 408 and the CPE 414. A similar test methodology is implemented by an on-site technician at the NIU 412. The technician injects a loopback code towards the repeater (or previously, upon arriving on site, used the manual push-button on the repeater) to activate the loopback towards the CPE 414. Test signals injected at the NIU can then be traced along transmission facilities 410 and analyzed using a test set to locate any cable or media faults.

The ability to pinpoint network faults as a result of the loopback functionality of the present invention ensures the correct network service personnel are dispatched in a timely and economical manner to correct the problems.

Although the present invention has been described and illustrated in detail, it is understood that the same is by way of illustration and example only, and is not to be taken as a limitation, in scope or spirit, of the present invention which is limited only by the terms of the appended claims.

The invention claimed is:

1. A repeater for interfacing between a digital service network and a local network span comprising:
   a first input port for connection to a first digital carrier link for coupling to a digital network;
   a first output port for connection to a second digital carrier link for coupling to digital terminal equipment;
   a first signal transmission path between the first input and output ports;
   a second input port for connection to the second digital carrier link for coupling to digital terminal equipment;
   a second output port for connection to the first digital carrier link fir coupling to a digital network;
   a second signal transmission path between the second input and output ports;
   a first selectably-activated loopback circuit which, when activated, provides a third signal transmission path between the first input port and the second output port;
   a second selectably-activated loopback circuit which, when activated, provides a fourth signal transmission path between the second input port and the first output port; and
   a controller coupled with the first and second selectably-activated loopback circuits configured to selectively activate the first and second selectably-activated loopback circuits individually and simultaneously.

2. The repeater of claim 1, wherein
   the first signal transmission path further comprises a first signal regenerator; and the second signal transmission path further comprises a second signal regenerator.

3. The repeater of claim 2, further comprising:
   a multi-position switch which activates the first signal regenerator when in a first position and de-activates the first signal regenerator when in a second position.

4. The repeater of claim 2, wherein the third transmission path further comprises the first signal regenerator when the first selectably-activated loopback circuit is activated; and
   the fourth transmission path further comprises the second signal regenerator when the second selectably-activated loopback circuit is activated.

5. The repeater of claim 1, further comprising:
   a first visual indicator which signals when only the first selectably-activated loopback circuit is activated;
   a second visual indicator which signals when only the second selectable-activated loopback circuit is activated; and
   a third visual indicator which signals when the first and second selectably-activated loopback circuits are both activated.

6. The repeater of claim 1, further comprising:
   a multi-state indicator, with a plurality of visually distinct operating states configured to:
      operate in a first state when only the first selectably-activated loopback circuit is activated;
      operate in a second state when only the second selectably-activated loopback circuit is activated; and
      operate in a third state when the first and second selectably-activated loopback circuits are both activated.

7. The repeater of claim 1, wherein the first signal transmission path further comprises:
   a line build-out circuit.

8. The repeater of claim 1, wherein the second signal transmission path further comprises:
   a pre-equalizing line build-out circuit.

9. The repeater of claim 1, further comprising:
   a selectably-enabled power supply which, when enabled, provides power to a second digital carrier link for coupling to digital terminal equipment.

10. The repeater of claim 1, wherein the controller further comprises:
    a multi-position local switch wherein the switch:
       activates the second selectably-activated loopback circuit when in a first position;
       activates both the first and second selectably-activated loopback circuits when in a second position;
       de-activates the first and second selectably-activated loopback circuits when in a third position.

11. The repeater of claim 1, wherein the controller further comprises:
    a first loopback code detector configured to:
       if the first selectably-activated loopback circuit is de-activated, detect a loop-up code received at the first input port and then activate the first selectably-activated loopback circuit; and
       detect a loop-down code received at the first input port and then de-activate both the first selectably-activated loopback circuit, if in an active state, and the second selectably-activated loopback circuit, if in an active state; and
    a second loopback code detector configured to:
       if the second selectably-activated loopback circuit is de-activated, detect a loop-up code received at the second input port and then activate the second selectably-activated loopback circuit; and
       detect a loop-down code received at second input and then de-activate both the first selectably-activated loopback circuit, if in an active state, and the second selectably-activated loopback circuit, if in an active state.

12. The repeater of claim 1, further comprising:
a first monitor jack for non-intrusively providing a monitor connection with the first signal transmission path; and
a second monitor jack for non-intrusively providing a monitor connection with the second signal transmission path.

13. The repeater of claim 12, further comprising:
a third jack for providing signal access to the first digital carrier link for coupling to a digital network; and
a fourth jack for providing signal access to the second digital carrier link for coupling to digital terminal equipment.

14. The repeater of claim 13, wherein signal access comprises signal detection and signal injection.

15. The repeater of claim 1, further comprising:
a first frame format detector configured to determine a first format of a first signal on the first signal transmission path;
a second frame format detector configured to determine a second format of a second signal on the second transmission path;
a first visual indicator which provides one of a first plurality of indications based on the first format; and
a second visual indicator which provides one of a second plurality of indicators based on the second format.

16. The repeater of claim 15 wherein the first and second formats of the first and second signals, respectively, are one of unframed, SF/D4, and T1-ESF.

17. The repeater of claim 1, wherein the first input port and the second output port are adapted for connection to a DSX-1 network.

18. The repeater of claim 1, wherein the second input port and the first output port are adapted for connection to a T1 span.

19. The repeater of claim 1, wherein the physical dimensions of the repeater conform to a Network Communication Terminal Equipment (NCTE) Standard 200-type or 400-type circuit card for a standard wall-mountable telecommunications shelf.

20. The repeater of claim 19 wherein the circuit card includes a 56 pin pin-out.

21. A terminal extension repeater for interfacing between a digital service network and a local network span comprising:
a first input port for connection with a terminal side of the digital service network, the first input port receiving a first digital signal;
a first output port for connection with a network side of the local network span connected with customer premises equipment, the first output port providing a first regenerated signal to the local network span;
a second input port for connection with the network side of the local network span connected with customer premises equipment, the second input port receiving a second digital signal;
a second output port for connection with the terminal side of the digital service network, the second output port providing a second regenerated signal to the digital service network;
a first signal regenerator coupled between the first input and output for generating the first regenerated signal based on the first digital signal
a second signal regenerator coupled between the second input and output for generating the second regenerated signal based on the second digital signal;
a first selectably-activated loopback circuit which, when activated, loops the first regenerated signal to the second output port;
a second selectably-activated loopback circuit which, when activated, loops the second regenerated signal to the first output port; and
a controller coupled with the first and second selectably-activated loopback circuits configured to selectively activate the first and second selectably-activated loopback circuits individually and simultaneously.

22. The terminal extension repeater of claim 21, wherein the controller further comprises:
a first loopback code detector configured to:
remotely activate the second selectably-activated loopback circuit when the second loopback code detector determines the second digital signal includes a loop-up code and the second selectably-activated loopback circuit is in a de-activated state;
remotely de-activate the second selectably-activated loopback circuit when the second loopback code detector determines the second digital signal includes a loop-down code and the second selectably-activated loopback circuit is in an activated state; and
remotely de-activate the first selectably-activated loopback circuit when the second loopback code detector determines the second digital signal includes a loop-down code and the first selectably-activated loopback circuit is in an activated state.

23. The terminal extension repeater of claim 22, wherein the first loopback detector is adapted to detect loop-up and loop-down codes in a plurality of formats.

24. The terminal extension repeater of claim 22, further comprising:
a second loopback code detector configured to:
remotely activate the first selectably-activated loopback circuit when the first loopback code detector determines the first digital signal includes a loop-up code and the first selectably-activated loopback circuit is in a de-activated state;
remotely de-activate the first selectably-activated loopback circuit when the first loopback code detector determines the first digital signal includes loop-down code and the first selectably-activated loopback circuit is in an activated state; and
remotely de-activate the second selectably-activated loopback circuit when the first loopback code detector determines the first digital signal includes a loop-down code and the second selectably-activated loopback circuit is in an activated state.

25. The terminal extension repeater of claim 24, wherein the second loopback detector is adapted to detect loop-up and loop-down codes in a plurality of formats.

26. The terminal extension repeater of claim 21, wherein the controller further comprises:
a multi-position local switch which, in a first position, simultaneously activates the first and second selectably-activated loopback circuits and, in a second position, de-activates all of the first and second selectably-activated loopback circuits which are activated.

27. The terminal extension repeater of claim 21, further comprising:
a line build-out circuit which adjustably attenuates the first regenerated signal before the first regenerated signal reaches the first output port; and
a pre-equalized circuit which adjustably re-shapes the second regenerated signal before the second regenerated signal reaches the second output port.

28. The terminal extension repeater of claim 21, further comprising:
a first monitor jack for non-intrusively providing a monitor connection with the first digital signal; and
a second monitor jack for non-intrusively providing a monitor connection with the second digital signal.

29. The terminal extension repeater of claim 21, further comprising:
a first frame format detector configured to determine a first format of the first signal;
a second frame format detector configured to determine a second format of the second signal;
a first visual indicator which provides one of a first plurality of indicators based on the first format; and
a second visual indicator which provides one of a second plurality of indicators based on the second format.

30. The terminal extension repeater of claim 29 wherein the first and second formats of the first and second signals, respectively, are one of unframed, SF/D4, and T1-ESF.

31. The terminal extension repeater of claim 21, wherein:
the first input port and the second output port are adapted for connection to a DSX-1 network; and
the second input port and the first output port are adapted for connection to a T1 span.

32. The terminal extension repeater of claim 21, wherein the physical dimensions of the terminal extension repeater conform to a Network Communication Terminal Equipment (NCTE) Standard 200-type or 400-type circuit card for a standard wall-mountable telecommunications shelf.

33. The terminal extension repeater of claim 32 wherein the circuit card includes a 56 pin pin-out.

34. A repeater for interfacing between a digital service network and a local network span comprising:
a first input port for connection to a first digital carrier link to a digital network;
a first output port for connection to a second digital carrier link to digital terminal equipment;
a first signal transmission path between the first input and output ports comprising a first signal regenerator;
a second input port for connection to the second digital carrier link to digital terminal equipment;
a second input port for connection to the first digital carrier link to a digital network;
a second output port for connection to the first digital carrier link to a digital network;
a second signal transmission path between the second input and output ports comprising a second signal regenerator;
a first monitor jack for non-intrusively providing a monitor connection with the first signal transmission path;
a second monitor jack for non-intrusively providing a monitor connection with the second signal transmission path; and
a controller coupled with first and second selectably-activated loopback circuits configured to selectively activate the first and second selectably-activated loopback circuits individually and simultaneously.

35. The repeater of claim 34, further comprising:
a multi-position switch which activates the first signal regenerator when in a first position and de-activates the first signal regenerator when in a second position.

36. The repeater of claim 35, further comprising:
a first frame format detector configured to determine a first format of a first signal on the first signal transmission path;
a second frame format detector configured to determine a second format of a second signal on the second transmission path;
a first visual indicator which provides one of a first plurality of indications based on the first format; and
a second visual indicator which provides one of a second plurality of indications based on the second format.

37. The repeater of claim 36 wherein the first and second formats of the first and second signals, respectively, are one of unframed SF/D4, and T1-ESF.

38. The repeater of claim 34, wherein the physical dimensions of the repeater conform to a Network Communication Terminal Equipment (NCTE) Standard 200-type or 400-type circuit card for a standard wall-mountable telecommunications shelf.

39. The repeater of claim 38 wherein the circuit card includes a 56 pin pin-out.

40. A repeater for interfacing between a digital service network and a local network span comprising:
a first input port for connection to a first digital carrier link to a digital network;
a first output port for connection to a second digital carrier link to a digital terminal equipment;
a first signal transmission path between the first input and output ports;
a second input port for connection to the second digital carrier link to digital terminal equipment;
a second output port for connection to the first digital carrier link to a digital network;
a second signal transmission path between the second input and output ports;
a first monitor jack for non-intrusively providing a monitor connection with the first signal transmission path;
a second monitor jack for non-intrusively providing a monitor connection with the second signal transmission path;
a first frame format detector configured to determine a first format of a first signal on the first signal transmission path;
a second frame format detector configured to determine a second format of a second signal on the second transmission path;
a first visual indicator which provides one of a first plurality of indications based on the first format;
a second visual indicator which provides one of a second plurality of indications based on the second format; and
a controller coupled with first and second selectably-activated loopback circuits configured to selectively activate the first and second selectably-activated loopback circuits individually and simultaneously.

41. The repeater of claim 40, wherein the physical dimensions of the repeater conform to a Network Communication Terminal Equipment (NCTE) Standard 200-type or 400-type circuit card for a standard wall-mountable telecommunications shelf.

42. The repeater of claim 41 wherein the circuit card includes a 56 pin pin-out.

* * * * *